(12) United States Patent
Lindoff et al.

(10) Patent No.: US 8,219,058 B2
(45) Date of Patent: Jul. 10, 2012

(54) RADIO RECEIVER (75) Inventors: Bengt Lindoff, Bjärred (SE); Anders Wallén, Ystad (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 601 days.

(21) Appl. No.: 12/374,306

(22) PCT Filed: Jul. 6, 2007

(86) PCT No.: PCT/EP2007/056903
§ 371 (c)(1),
(2), (4) Date: Jul. 17, 2009

(87) PCT Pub. No.: WO2008/009574
PCT Pub. Date: Jan. 24, 2008

(65) Prior Publication Data
US 2010/0022212 A1 Jan. 28, 2010

(30) Foreign Application Priority Data
Jul. 20, 2006 (EP) .................................... 06117574

(51) Int. Cl.
H04B 1/06 (2006.01)
H04B 7/00 (2006.01)
(52) U.S. Cl. ..................... 455/232.1; 455/134; 455/135; 455/136; 455/138; 330/279; 330/129; 330/136; 330/282
(58) Field of Classification Search .................. 455/501, 455/63.1, 513, 130, 134, 135, 136, 138, 168.1, 455/234.1, 245.1, 296, 232.1, 250.1; 330/279, 330/129, 136, 282
See application file for complete search history.

(56) References Cited

U.S. PATENT DOCUMENTS

| 6,714,551 B1 * | 3/2004 | Le-Ngoc ....................... 370/401 |
| 2004/0097209 A1 | 5/2004 | Haub et al. |
| 2011/0105070 A1 * | 5/2011 | Li et al. ...................... 455/226.2 |

OTHER PUBLICATIONS

PCT International Preliminary Report on Patentability, mailed Jul. 29, 2008, in connection with International Application No. PCT/EP2007/056903.
PCT International Search Report, mailed Sep. 14, 2007, in connection with International Application No. PCT/EP2007/056903.
Kuan et al.: "Joint-Detection and Interference Cancellation Based Burst-by-Burst Adaptive CDMA Schemes" IEEE Transactions on Vehicular Technology, IEEE Service Center, Piscataway, NJ, US, vol. 51, No. 6, Nov. 2002, XP011080747, ISSN: 0018-9545.
Lau et al.: "Variable Rate Adaptive Modulation for DS-CDMA" IEEE Transactions on Communications, vol. 47, No. 4, Apr. 1999, pp. 577-589, XP002413471. Retrieved from the Internet: URL: ieeexplore.ieee.org/iel5/26/16551/00764931. pdf?arnumber=764931.

* cited by examiner

*Primary Examiner* — Tuan Pham
(74) *Attorney, Agent, or Firm* — Potomac Patent Group PLLC (57) ABSTRACT

A radio receiver adapted to alternatively receive data over a communication channel in a first mode and a second mode. The second mode facilitates reception of data at higher data rates than the first mode. The radio receiver comprises a signal-processing unit and a control unit. The signal processing unit is adapted to determine a quality condition of the communication channel. The control unit is adapted to determine, based on the quality condition, whether the communication channel facilitates operation in the second mode and assess at least one configuration condition, one of the at least one configuration condition being that the communication channel is determined to facilitate operation in the second mode. The control unit is further adapted to configure the radio receiver to operate in the second mode when all of at least one configuration condition are fulfilled or to operate in the first mode otherwise. A method for controlling the radio receiver is also disclosed.

26 Claims, 6 Drawing Sheets

RADIO RECEIVER

CROSS-REFERENCE TO RELATED APPLICATIONS

This application claims priority under 35 U.S.C. §119 to European Patent Application No. 06117574.1, filed Jul. 20, 2006, which is hereby incorporated herein by reference in its entirety. This application also claims the benefit of U.S. Provisional Application No. 60/807,954, filed Jul. 21, 2006, which is hereby incorporated herein by reference in its entirety.

TECHNICAL FIELD

The present invention relates to a radio receiver and a method for operating a radio receiver.

BACKGROUND

There has been a gradual shift in focus from circuit-switched, speech centric usage, towards packet-switched data traffic in the current mobile cellular standards and technologies like GSM (Global System for Mobile Communications) and WCDMA (Wideband Code-Division Multiple Access). Along with that, a strive for higher data rates have resulted in additions to the standards and technologies, like EDGE (Enhanced Data rates for Global Evolution) for GSM and HSDPA (High-Speed Downlink Packet Access) for WCDMA. The complexity of radio transceiver circuitry increases with increasing data rates. For example, the requirements on signal purity in transmitting and receiving circuitry increases in order to meet the requested high data rates.

A mechanism that makes reception at high data rates more difficult than reception at low data rates is that the effective energy per transmitted information bit is reduced with increasing data rate. This is a reason for the increased requirements on signal purity in the transmitting and receiving circuitry. A traditional solution to improve the signal purity when the energy per bit decreases is to design a radio transceiver with significantly harder requirements with respect to e.g. noise figure, frequency and timing drift, phase noise, image rejection, and introduction of DC offsets to the received signal. Hence, the complexity of a radio transceiver tends to increase as data rates increase. A problem with this type of traditional solution is that the resulting circuitry will occupy a larger chip area, which results in higher cost. Furthermore, the power consumption of such circuitry is relatively high, leading to reduced battery operating time. These negative side effects are constantly present, despite the fact that the highest achievable data rates are normally used relatively rarely. A reason for this is that a typical user utilizes the high data rates only occasionally. Another reason is that the highest data rates require very good radio conditions, which can typically be found within line of sight of a base station.

SUMMARY

It is an object to provide a radio receiver with reduced complexity.

According to a first aspect, a method for operating a radio receiver is provided. The radio receiver is adapted to alternatively receive data over a communication channel in a first mode and a second mode. The second mode facilitates reception of data at higher data rates than the first mode.

The method comprises determining a quality condition of the communication channel. The method further comprises determining whether the communication channel facilitates operation in the second mode based on the quality condition. Moreover, the method comprises assessing at least one configuration condition. One of the at least one configuration condition is that the communication channel is determined to facilitate operation in the second mode. Further, the method comprises configuring the radio receiver to operate in the second mode when all of the at least one configuration condition are fulfilled or, otherwise, configuring the radio receiver to operate in the first mode.

Configuring the radio receiver may comprise configuring an automatic gain-control loop of the radio receiver.

Configuring the radio receiver to operate in the second mode may comprise locking an automatic gain-control unit of the automatic gain-control loop.

Configuring the radio receiver to operate in the first mode may comprise enabling a DC-block unit of the automatic gain-control loop. Configuring the radio receiver to operate in the second mode may comprise disabling the DC-block unit.

Configuring the radio receiver to operate in the first mode may comprise setting a cut-off frequency of a filter of the DC-block unit to a first value. Configuring the radio receiver to operate in the second mode may comprise setting the cut-off frequency of said filter to a second value. The first value may be higher than the second value.

The quality condition may be a signal-to-interference ratio of the communication channel. Determining whether the communication channel facilitates operation in the second mode may comprise determining that the communication channel facilitates operation in the second mode when the signal to interference ratio exceeds a threshold value or, otherwise, determining that the communication channel does not facilitate operation in the second mode.

The method may further comprise determining, based on control data received over the communication channel, whether data to be received is expected to be transmitted over the communication channel at any data rate, for which reception of data is facilitated in the second mode but not in the first mode. One of said at least one configuration condition may be that the data to be received is expected to be transmitted over the communication channel at said any data rate, for which reception of data is facilitated in the second mode but not in the first mode.

Determining whether the data to be received is expected to be transmitted over the communication channel at said any data rate, for which reception of data is facilitated in the second mode but not in the first mode, may comprise deriving, from the control data, the number of data packet channelization codes to be used for the data to be received. Whether the data to be received is expected to be transmitted over the communication channel at said any data rate, for which reception of data is facilitated in the second mode but not in the first mode, may be determined based on said number of data packet channelization codes.

Determining whether the data to be received is expected to be transmitted over the communication channel at said any data rate, for which reception of data is facilitated in the second mode but not in the first mode, may comprise deriving, from the control data, a modulation format to be used for the data to be received. Whether the data to be received is expected to be transmitted over the communication channel at said any data rate, for which reception of data is facilitated in the second mode but not in the first mode, may be determined based on said modulation format.

Determining whether the data to be received is expected to be transmitted over the communication channel at said any data rate, for which reception of data is facilitated in the second mode but not in the first mode, may comprise deriving, from the control data, a code rate to be used for the data to be received. Whether the data to be received is expected to be transmitted over the communication channel at said any data rate, for which reception of data is facilitated in the second mode but not in the first mode, may be determined based on said code rate.

The communication channel may e.g. be a high-speed downlink packet access communication channel or an orthogonal frequency-division multiplexing communication channel.

According to a second aspect, a computer program product comprises computer program code means for executing the method when said computer program code means are run by an electronic device having computer capabilities.

According to a third aspect, a computer readable medium has stored thereon a computer program product comprising computer program code means for executing the method when said computer program code means are run by an electronic device having computer capabilities.

According to a fourth aspect, a radio receiver adapted to alternatively receive data over a communication channel in a first mode and a second mode is provided. The second mode facilitates reception of data at higher data rates than the first mode.

The radio receiver comprises a signal-processing unit adapted to determine a quality condition of the communication channel. The radio receiver further comprises a control unit adapted to determine, based on the quality condition, whether the communication channel facilitates operation in the second mode. The control unit is further adapted to assess at least one configuration condition. One of the at least one configuration condition is that the communication channel is determined to facilitate operation in the second mode. Moreover, the control unit is adapted to configure the radio receiver to operate in the second mode when all of the at least one configuration condition are fulfilled or, otherwise, configure the radio receiver to operate in the first mode.

The radio receiver may comprise an automatic gain-control loop. The control unit may be adapted to configure the automatic gain-control loop.

The automatic gain-control loop may comprise a variable-gain amplifier and an automatic gain-control unit arranged to control a gain of the variable-gain amplifier. The control unit may be adapted to lock the automatic gain-control unit in the second mode.

The automatic gain-control loop may comprise a DC-block unit.

The control unit may be adapted to enable the DC-block unit in the first mode and disable the DC-block unit in the second mode.

The DC-block unit may comprise a filter. The control unit may be adapted to set a cut-off frequency of the filter to a first value in the first mode. The control unit may be adapted to set said cut-off frequency to a second value in the second mode. The first value may be higher than the second value.

The quality condition may be a signal-to-interference ratio of the communication channel. The control unit may be adapted to determine that the communication channel facilitates operation in the second mode when the signal-to-interference ratio exceeds a threshold value.

The signal-processing unit may further be adapted to extract control data from a received signal. The control unit may further be adapted to determine, based on said control data, whether data to be received is expected to be transmitted over the communication channel at any data rate, for which reception of data is facilitated in the second mode but not in the first mode. One of said at least one configuration condition may be that the data to be received is expected to be transmitted over the communication channel at said any data rate, for which reception of data is facilitated in the second mode but not in the first mode.

The control unit may be adapted to derive, from the control data, the number of data packet channelization codes to be used for the data to be received. The control unit may be further adapted to determine whether the data to be received is expected to be transmitted over the communication channel at said any data rate, for which reception of data is facilitated in the second mode but not in the first mode, based on said number of data packet channelization codes.

The control unit may be adapted to derive, from the control data, a modulation format to be used for the data to be received. The control unit may be further adapted to determine whether the data to be received is expected to be transmitted over the communication channel at said any data rate, for which reception of data is facilitated in the second mode but not in the first mode, based on said modulation format.

The control unit may be adapted to derive, from the control data, a code rate to be used for the data to be received. The control unit may be further adapted to determine whether the data to be received is expected to be transmitted over the communication channel at said any data rate, for which reception of data is facilitated in the second mode but not in the first mode, based on said code rate.

The communication channel may e.g. be a high-speed downlink packet access communication channel or an orthogonal frequency-division multiplexing communication channel.

According to a fifth aspect, a communication unit comprises the radio receiver. The communication unit may e.g. be a portable or handheld mobile radio communication unit, a mobile radio terminal, a mobile telephone, a pager, a communicator, an electronic organizer, or a smartphone.

Further embodiments of the invention are defined in the dependent claims.

It should be emphasized that the term "comprises/comprising" when used in this specification is taken to specify the presence of stated features, integers, steps, or components, but does not preclude the presence or addition of one or more other features, integers, steps, components, or groups thereof.

BRIEF DESCRIPTION OF THE DRAWINGS

Further objects, features and advantages of embodiments of the invention will appear from the following detailed description, reference being made to the accompanying drawings, in which.

DETAILED DESCRIPTION

Figure 1:
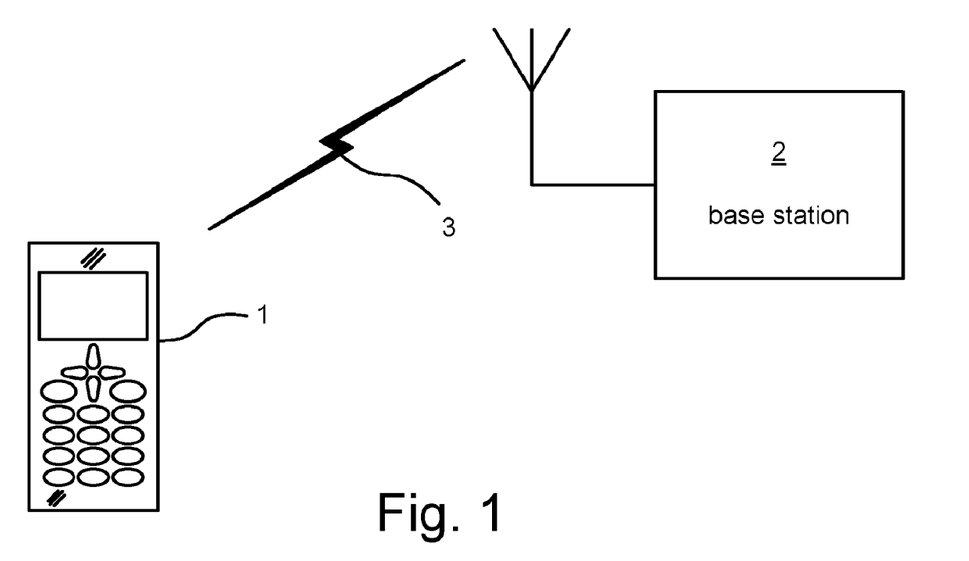
FIG. 1 is a schematic view of a mobile communication unit and a base station.

FIG. 1 illustrates an environment where the present invention may be applied. A mobile communication unit 1, such as a mobile telephone, communicates with a radio base station 2 over a communication channel 3. The communication channel 3 may e.g. be a wideband code-division multiple-access (WCDMA) communication channel. A WCDMA scenario will be used as an example throughout the description. However, the invention is not limited to WCDMA, but the invention may be applied in other types of communication environments and also to scenarios other than that depicted in FIG. 1. For example, the invention could be applied in an orthogonal frequency-division multiplexing (OFDM) system, such as the proposed 3GPP Long Term Evolution system.

High-speed downlink packet access (HSDPA) is an addition to the WCDMA technology. HSDPA specifies a plurality of different data rates. HSDPA comprises a set of different physical downlink channels, including a high-speed physical-downlink shared channel (HS-PDSCH), which contains the actual data traffic, and a high-speed shared control channel (HS-SCCH), which contains control data on how to receive and demodulate data transmitted in the HS-PDSCH.

The communication channel 3, when referred to in this specification, may comprise a plurality of physical channels. It may e.g. comprise a physical channel for control data, such as an HS-SCCH in HSDPA, and a physical channel for data traffic, such as an HS-PDSCH in HSDPA, as well as various other uplink and downlink physical channels. Hence, data received or transmitted over any such physical channel is, in this specification, referred to as data received or transmitted over the communication channel 3.

The highest data rates available in HSDPA can only be used under specific conditions of the communication channel 3. An example of such a specific condition is that the communication channel 3 should be approximately an additive white Gaussian noise (AWGN) channel with a relatively low amount of noise and interference. For example, a signal-to-interference ratio (SIR) higher than 15 dB is required to facilitate data rates of 10 Mbit/s and higher in HSDPA.

Under the specific channel conditions that allow the use of the highest data rates, the achievable data rate is normally limited by signal impairments introduced in the receiver circuitry. Under poor channel conditions, that only allow the use of lower data rates, the achievable data rate is normally limited by signal impairments introduced in the communication channel 3, e.g. by multi-path fading and external interferers. These facts are exploited in embodiments described below. Under the specific channel conditions that allow the use of the highest data rates, a radio receiver 4 (FIG. 2) may be configured e.g. by reconfiguring, enabling and/or disabling parts of the radio receiver. Said parts of the radio receiver 4 may be the parts that are used under poor channel conditions for compensation of signal impairments introduced in the communication channel 3. By configuring the radio receiver 4, signal impairments introduced in the radio receiver circuitry are reduced. Hence, by configuring the radio receiver 4, the radio receiver 4 will be better suited for reception of data at the highest data rates. Examples of configurations that may be performed will be given in the context of specific embodiments.

Figure 2:
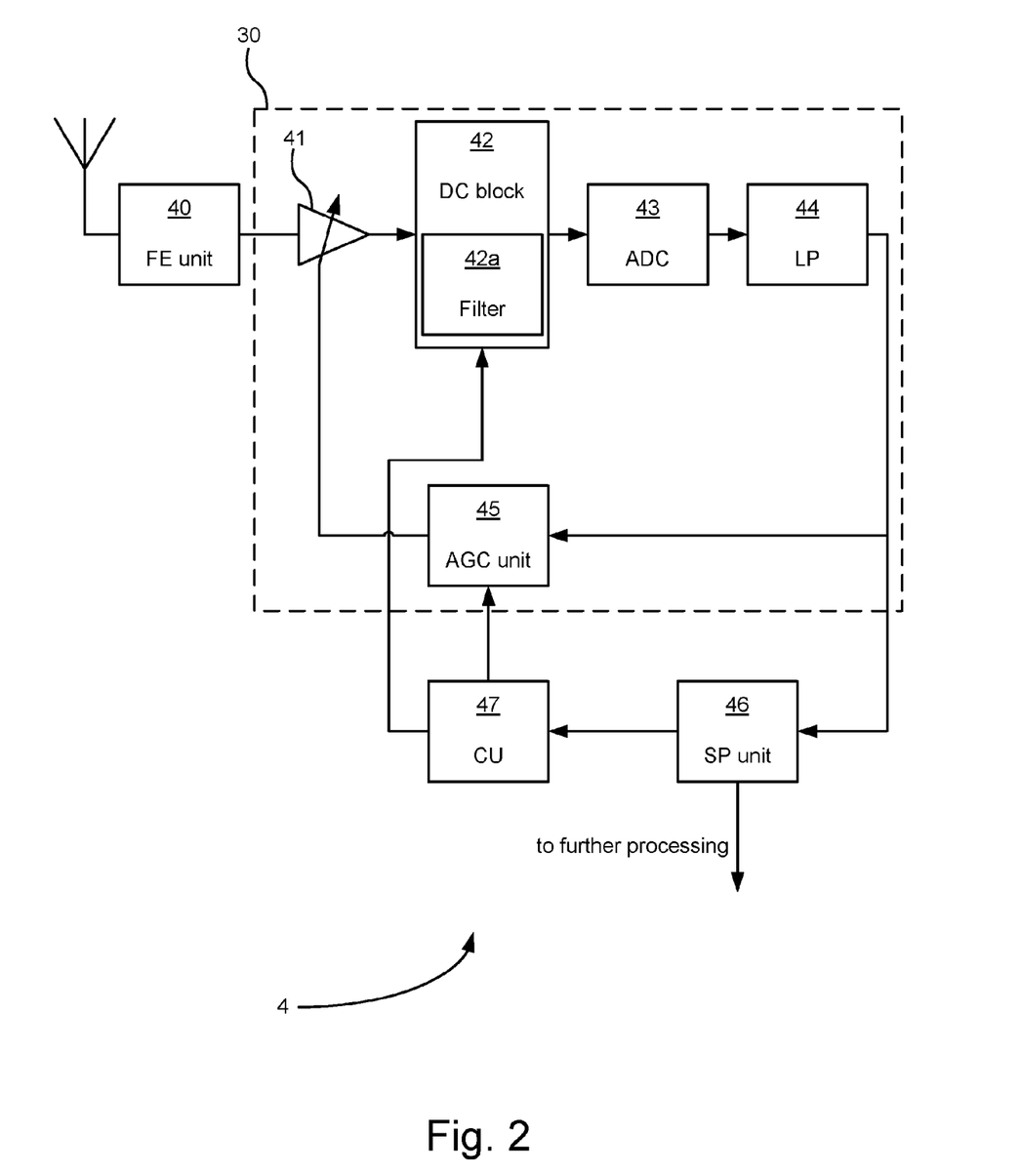
FIG. 2 is a block diagram of a radio receiver according to an embodiment.

FIG. 2 is a block diagram of an embodiment of a radio receiver 4, which comprises an automatic gain-control (AGC) loop 30. The radio receiver 4 is adapted to alternatively receive data over the communication channel 3 in a first and a second mode. The second mode facilitates reception of data at higher data rates than the first mode. The radio receiver 4 may e.g. be comprised in the mobile communication unit 1 (FIG. 1).

In the embodiment of FIG. 2, the AGC loop 30 is adapted to stabilize a signal-level of a received signal internally in the radio receiver 4. The signal level may e.g. be an average power level. According to HSDPA embodiments, the average power level may be the average power level over one or more HSDPA time slots, such as but not limited to one, two, or three time slots.

In embodiments described herein, the first mode is a mode that may be used under relatively poor conditions of the communication channel. In the first mode, parts of the radio receiver 4 are configured to compensate for signal impairments introduced in the channel.

The second mode, on the other hand, is a mode that may be used under relatively good channel conditions. In the second mode, parts of the radio receiver 4 are configured to reduce the signal impairments introduced by the parts themselves, compared with operation in the first mode. Using the second mode under the relatively poor channel conditions may deteriorate the robustness of the receiver compared with using the first mode. Hence, in accordance with some embodiments, the second mode should only be used when the communication channel 3 facilitates operation in the second mode.

According to an HSDPA embodiment, the data rates that are facilitated in the second mode but not in the first mode are data rates of 10 Mbit/s and higher. According to another HSDPA embodiment, the data rates that are facilitated in the second mode but not in the first mode include only the highest data rate in HSDPA (14 Mbit/s). In other embodiments, other data rates may be facilitated in the second mode but not in the first. Which these data rates are may vary between different applications and receiver implementations. Experimentation through e.g. simulation and measurements may be needed to determine which data rates are facilitated in the second mode but not in the first, and to determine which channel conditions facilitates operation in the second mode.

In the embodiment of FIG. 2, the radio receiver 4 comprises a front-end (FE) unit 40. The AGC loop 30 comprises a variable-gain amplifier (VGA) 41 operatively connected to an output of the FE unit 40, and a DC-block unit 42 operatively connected to an output of the VGA 41. Moreover, the AGC loop 30 comprises an analog-to-digital converter (ADC) 43 operatively connected to an output of the DC-block unit 42 and a digital low-pass (LP) filter 44 arranged to filter a digital output signal of the ADC 43.

An output of the LP filter 44 is connected to an AGC unit 45 comprised in the AGC loop 30. The output of the LP filter 44 is further connected to a signal-processing (SP) unit 46 comprised in the radio receiver 4.

The radio receiver 4 further comprises a control unit (CU) 47, arranged to receive information from the SP unit 46. The CU 47 is further adapted to configure the radio receiver 4 to operate in the first or the second mode based on information received by the CU 47 from the SP unit 46.

Each of the AGC unit 45, SP unit 46, and CU 47 may e.g. be implemented in hardware, software, or a combination thereof. For example, each of said units may be implemented with a programmable hardware unit, such as a processor, an application-specific hardware unit, or a combination thereof.

As indicated in FIG. 2, the DC-block unit 42 may comprise a filter 42a, such as a high-pass (HP) or band-pass (BP) filter.

The functionality of the different blocks of the radio receiver 4 according to the embodiment of FIG. 2 will now be described in more detail. The FE unit 40 is adapted to down convert a radio-frequency (RF) signal, e.g. transmitted from a unit external to the radio receiver, such as the base station 2 (FIG. 1). Further, the FE unit 40 is adapted to output a signal having a lower frequency than the RF signal, such as a base-band signal or an intermediate-frequency (IF) signal. The RF signal comprises control data, such as control data transmitted over an HS-SCCH in HSDPA, and/or actual data traffic, such as data transmitted over an HS-PDSCH in HSDPA. The FE unit 40 may e.g. be implemented using mixers and filters arranged to perform said down conversion in a known way.

The VGA 41 has a variable gain, which is controlled by the AGC unit 45 in order to obtain a relatively stable signal level for an output signal from the VGA 41. Said signal level may e.g. be an average power level.

The DC-block unit 42 is adapted to remove or reduce a DC offset in the output signal from the VGA 41. The DC-block unit 42 is further adapted to suppress or attenuate unwanted slowly varying signals in the output of the VGA 41. Such slowly varying signals may e.g. arise from adjusting the gain of the VGA 41. As described above, the DC-block unit 42 may include the filter 42*a*, which may e.g be a high-pass (HP) filter or a band-pass (BP) filter, for removing or reducing the DC offset and/or attenuating the unwanted slowly varying signals that are present in the output signal from the VGA 41.

The ADC 43 is adapted to convert the output signal from the DC-block unit 42 to a digital output signal, thereby enabling further signal processing using digital signal processing techniques.

The LP filter 44 is adapted to suppress or remove noise and distortion outside of a signal band of the digital output signal from the ADC 43.

The AGC unit 45 is adapted to determine, e.g. by calculating, estimating, or measuring a signal level, such as an average power level, of the output signal from the LP filter 44. The AGC unit 45 is further adapted to control the gain of the VGA 41 based on said signal level, thereby suppressing variations in the signal level of the output signal from the VGA 41.

The SP unit 46 is adapted to determine a quality condition of the communication channel 3. The quality condition is based on a received signal.

The SP unit 46 is further adapted to extract or derive control data, such as the control data in an HS-SCCH in HSDPA, based on the output of the LP filter 44. In some embodiments, the SP unit 46 is adapted to perform additional signal-processing tasks, such as channel equalization. The SP unit 46 is arranged to forward the output from the LP filter 44, possibly after channel equalization, for further processing. Further processing may e.g. include demodulation and recovery of received data.

The SP unit 46 is adapted to communicate information regarding the quality condition of the communication channel 3 to the CU 47. The CU 47 is adapted to determine whether the communication channel 3 facilitates operation in the second mode based on the quality condition.

According to an embodiment, the quality condition is a SIR of the communication channel 3. Said SIR may e.g. be the SIR of a received pilot signal.

In some embodiments, the CU 47 is adapted to compare the SIR with a threshold value. The CU 47 is further adapted to determine that the communication channel 3 facilitates operation in the second mode when the SIR exceeds the threshold value. The threshold value may be different in different embodiments. In some HSDPA embodiments, wherein the data rates facilitated in the second mode but not in the first mode are data rates of 10 Mbit/s and higher, a threshold value of at least 15 dB is suitable.

According to another embodiment, the quality condition is a power-delay profile (PDP) of the communication channel 3. A PDP with a single dominating peak indicates a clear line-of-sight between e.g. the mobile communication unit 1 and the base station 2 (FIG. 1). A PDP having several peaks of comparable size, however, indicates the presence of multipath fading due to e.g. signal reflection on obstructing objects. The communication channel 3 may e.g. be determined to facilitate operation in the second mode when a power ratio between the largest peak of the PDP and one or more other peaks of the PDP, such as the second largest peak or all other peaks, exceeds a threshold value.

According to yet another embodiment, the quality condition is a combination of an SIR and a PDP. In this embodiment, the communication channel 3 is determined to facilitate operation in the second mode when the SIR exceeds a first threshold value and the above power ratio between peaks in the PDP exceeds a second threshold value.

The CU 47 is adapted to assess at least one configuration condition. The CU 47 is further adapted to configure the radio receiver 4 to operate in the second mode when all of the at least one configuration condition are fulfilled, and to configure the radio receiver 4 to operate in the first mode otherwise. According to embodiments, one of the at least one configuration condition is that the communication channel 3 is determined to facilitate operation in the second mode.

According to some embodiments, the CU 47 is adapted to configure the radio receiver 4 to operate in the second mode when the communication channel 3 is determined to facilitate operation in the second mode and to configure the radio receiver 4 to operate in the first mode otherwise, i.e. when the communication channel 3 is determined not to facilitate operation in the second mode. In these embodiments, the above configuration condition, i.e. that the communication channel 3 is determined to facilitate operation in the second mode, is the only configuration condition.

According to other embodiments, the CU 47 is adapted to configure the radio receiver 4 to operate in the second mode when the communication channel 3 is determined to facilitate operation in the second mode and one or more additional configuration conditions are fulfilled as well, and to configure the radio receiver 4 to operate in the first mode otherwise.

In one embodiment, said additional configuration condition is that the data to be received is expected to be transmitted over the communication channel 3 at a data rate, for which reception of data is facilitated in the second mode but not in the first mode. Such a data rate, for which reception of data is facilitated in the second mode but not in the first mode, will in this specification be referred to as a high data rate. Similarly, a data rate for which reception of data is facilitated in the first mode will be referred to as a low data rate. In this embodiment, the SP unit 46 is additionally adapted to communicate the control data to the CU 47. The CU 47 is additionally adapted to determine, based on the control data, whether data to be received is expected to be transmitted over the communication channel 3 at a high data rate.

According to an embodiment, the control unit 47 is adapted to configure the radio receiver 4 to operate in the second mode by at least configuring the AGC loop 30 as described below.

When the AGC unit 45 modifies the gain of the VGA 41, dynamically varying DC-level shifts are introduced in the output of the VGA 41. These dynamically varying DC-level shifts may appear as an approximately piecewise constant signal that changes its level at the time instants when the AGC unit 45 updates the gain of the VGA 41. To some extent, these DC-level shifts are suppressed by the DC-block unit 42. However, signal impurities, e.g. spikes or glitches, due to the DC-level shifts remain in the output of the DC-block unit 42. Such signal impurities may contribute to bit errors and deteriorate the bit-error rate (BER) of the radio receiver.

When the communication channel 3 facilitates operation in the second mode, the signal level of the input signal to the VGA 41 is relatively stable. In situations where the signal level of the input signal of the VGA 41 is relatively stable, such as but not limited to when the average signal power varies less than 1.5 dB, the gain of the VGA 41 does not necessarily need to be adjusted. Hence, the AGC unit 45 may be locked. For example, an output signal from the AGC unit 45 used for controlling the gain of the VGA 41 may be set to a constant value. By locking the AGC unit 45, the above-mentioned DC-level shifts are eliminated. Thereby, signal impairments introduced in the radio receiver 4, in this case in the VGA 41, is reduced and the BER of the radio receiver can be improved. Therefore, in an embodiment, the CU 47 is adapted to configure the radio receiver 4 to operate in the second mode by locking the AGC unit 45, whereby data reception at high data rates is facilitated.

In other embodiments, instead of locking the AGC unit 45, the AGC unit 45 is, in the second mode, configured to reduce the adjustments of the gain of the VGA 41 compared with operation in the first mode. Thereby, the signal impairments introduced by the DC-level shifts in the output of the VGA 41 are reduced in the second mode compared with the first mode. For example, in one embodiment, an update period of the AGC unit 45, i.e. the amount of time between the time instants when the AGC unit 45 updates the gain of the VGA 41, is increased in the second mode compared with the first mode, whereby data reception at high data rates is facilitated. According to another embodiment, the AGC unit 45 may, in the second mode, be configured to update the gain of the VGA 41 only when the signal level has changed more than a threshold value. The threshold value may e.g. be predefined.

The DC-block unit 42 may be a source of so called inter-chip interference (ICI). In e.g. HSDPA, the ICI introduced by the DC-block unit 42 may contribute to bit errors and may deteriorate the BER of the radio receiver. This problem gets worse with increasing data rate. When the AGC unit 45 is locked or configured to reduce the adjustments of the gain of the VGA 41 compared with the first mode, as described above, the requirements on the DC-block unit 42 in terms of suppression of DC-level shifts and unwanted slowly varying signals are relaxed.

Further, when the communication channel 3 facilitates operation in the second mode, the signal impairments introduced by DC-level shifts in the output of the VGA 41 are reduced, compared with when the communication channel 3 does not facilitate operation in the second mode, even when the AGC unit 45 is not locked or configured to reduce the adjustments of the gain of the VGA 41. This is due to that the signal level of the input signal to the VGA 41 is relatively stable and, therefore, less adjustment of the gain is required in order to stabilize the signal level of the output signal from the VGA 41. Therefore, the requirements on the DC-block unit 42 in terms of suppression of DC-level shifts and unwanted slowly varying signals may be relaxed also when the AGC unit 45 is not locked or configured to reduce the adjustments of the gain of the VGA 41.

When the requirements on the DC-block unit 42 in terms of suppression of DC-level shifts and unwanted slowly varying signals are relaxed, as described above, the DC-block unit 42 can be disabled, e.g. by letting the output of the VGA 41 pass directly to the input of the ADC 43. Alternatively, the lower cut-off frequency of the HP or BP filter 42*a* in the DC-block unit 42 can be reduced, compared with the lower cut-off frequency that is used when the radio receiver 4 is configured to operate in the first mode. By disabling the DC-block unit 42 or reducing said lower cut-off frequency, the ICI introduced by the DC-block unit 42 will be eliminated or reduced, respectively. Thereby, the signal purity will be improved. As a consequence, the BER of the radio receiver will also be reduced.

In an embodiment, the CU 47 is adapted to configure the radio receiver 4 to operate in the second mode by disabling the DC-block unit 42, whereby data reception at high data rates is facilitated. Additionally, the AGC unit 45 may be locked or configured to reduce the adjustments of the gain of the VGA 41 compared with the first mode. Further, the CU 47 is adapted to configure the radio receiver to operate in the first mode by enabling the DC-block unit 42.

In another embodiment, the CU 47 is adapted to configure the radio receiver 4 to operate in the first mode by setting said cut-off frequency of the filter 42*a* to a first value. Further, the CU 47 is adapted to configure the radio receiver 4 to operate in the second mode by setting said cut-off frequency of the filter 42*a* to a second value, wherein the second value is lower than the first value, whereby data reception at high data rates is facilitated. Additionally, for operation in the second mode, the AGC unit 45 may be locked or configured to reduce the adjustments of the gain of the VGA 41 compared with the first mode.

If the communication channel 3 does not facilitate operation in the second mode, configuring the receiver to operate in the second mode by making the above-mentioned configurations of the AGC unit 45 and/or the DC block unit 42 may severely deteriorate the robustness of the radio receiver and, possibly, deteriorate the BER of the radio receiver.

The embodiment illustrated in FIG. 2 should only be considered as an example. Some of the units shown in FIG. 2 may be omitted in some embodiments, and other additional units may be included. Further, the units of the radio receiver 4 may, in some embodiments, be arranged and connected in other ways than illustrated in FIG. 2. For example, according to an embodiment, the AGC loop 30 is entirely analog. Then, the ADC 43 and the digital LP filter 44 are omitted in the AGC loop 3C, and the output from the DC-block unit 42 is fed directly to the AGC unit 45, which in this embodiment operates on an analog input signal. The AGC loop 30 may additionally comprise e.g. level-shifting circuitry (not shown) for ensuring proper operating points within the AGC loop 30. Further, the output of the DC-block unit 42 is in this embodiment fed to the input of the SP unit 46. The SP unit 46 may comprise an ADC (not shown) for converting the output from the DC-block unit 42 to a digital signal, thereby enabling the use of digital signal processing techniques within the SP unit 46.

Figure 3A:
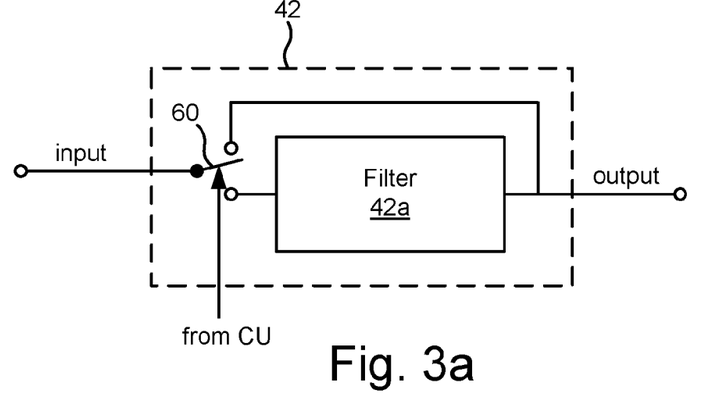
FIGS. 3a-c are block diagrams of embodiments of a DC-block unit.

FIG. 3*a* shows a block diagram of an embodiment of the DC-block unit 42, which is adapted to be enabled and disabled by the CU 47 when the radio receiver 4 is configured to operate in the first and the second mode, respectively. For operation in the first mode, the input signal to the DC-block unit 42 is directed to the filter 42*a* via a switch 60, which is controlled from the CU 47. For operation in the second mode, the switch 60 is set by the CU 47 to bypass the filter 42*a*, whereby the input signal to the DC-block unit 42 is forwarded directly as an output signal of the DC-block unit 42 and, hence, the DC-block unit 42 is disabled.

Figure 3B:
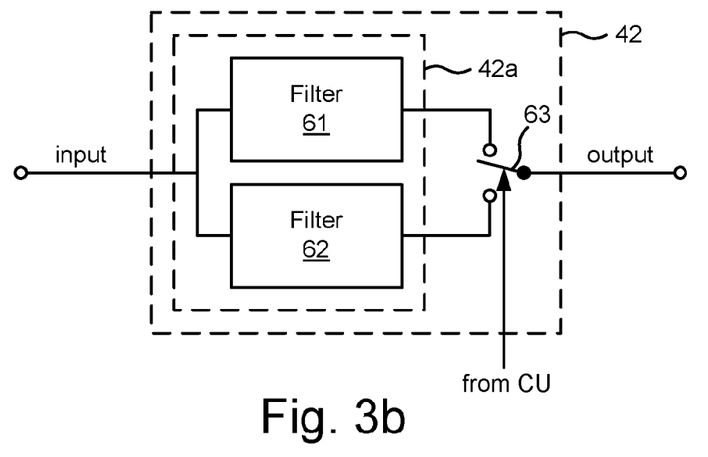

FIG. 3*b* shows another embodiment of the DC-block unit 42. In this embodiment, the filter 42*a* has a controllable lower cut-off frequency, which may be controlled from the CU 47. The filter 42*a* comprises a first sub filter 61 and a second sub filter 62. The lower cut-off frequency of the first sub filter 61 has said first value. The lower cut-off frequency of the second sub filter 62 has said second value. The input signal to the DC-block unit 42 is fed as an input signal to both the first sub filter 61 and the second sub filter 62. A switch 63, which is controlled from the CU 47, selects the output signal from either the first sub filter 61 or the second sub filter 62, and forwards the selected output signal as an output signal of the DC-block unit 42. For operation in the first mode, the switch 63 is set to select the output signal from the first sub filter 61. For operation in the second mode, the switch 63 is set to select the output signal from the second sub filter 62. According to other embodiments, more than two sub filters may be employed in order to obtain more degrees of freedom in setting the cut-off frequency of the filter 42a.

Figure 3C:
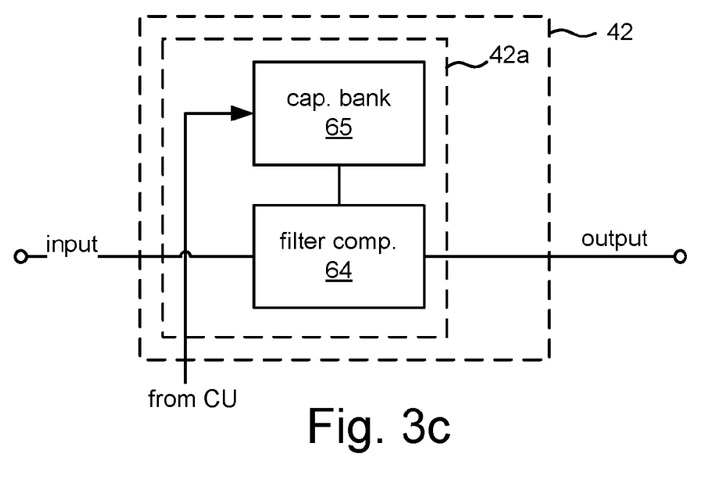

According to some embodiments, the filter 42a is implemented using active components, such as operational amplifiers and/or transconductors, in combination with passive components, such as resistors and/or capacitors. For example, the filter 42a may be implemented as an active-RC filter or a Gm-C filter. It is well known how to tune or adjust the frequency response of such filter implementations by varying capacitance values for capacitors in the filter. FIG. 3c shows an embodiment of the DC-block unit 42, wherein the filter 42a comprises a block of filter components 64, e.g. active and passive components, and a capacitor bank 65. The capacitor bank 65 comprises a plurality of switchable capacitors that may be individually connected to or disconnected from internal nodes of the filter 42a in order to change capacitance values and, consequently, the cut-off frequency of the filter 42a. This may e.g. be performed in accordance with well-known filter-tuning techniques. In the embodiment of FIG. 3c, the capacitor bank 65, and hence the cut-off frequency of the filter 42a, is controlled from the CU 47.

Figure 4:
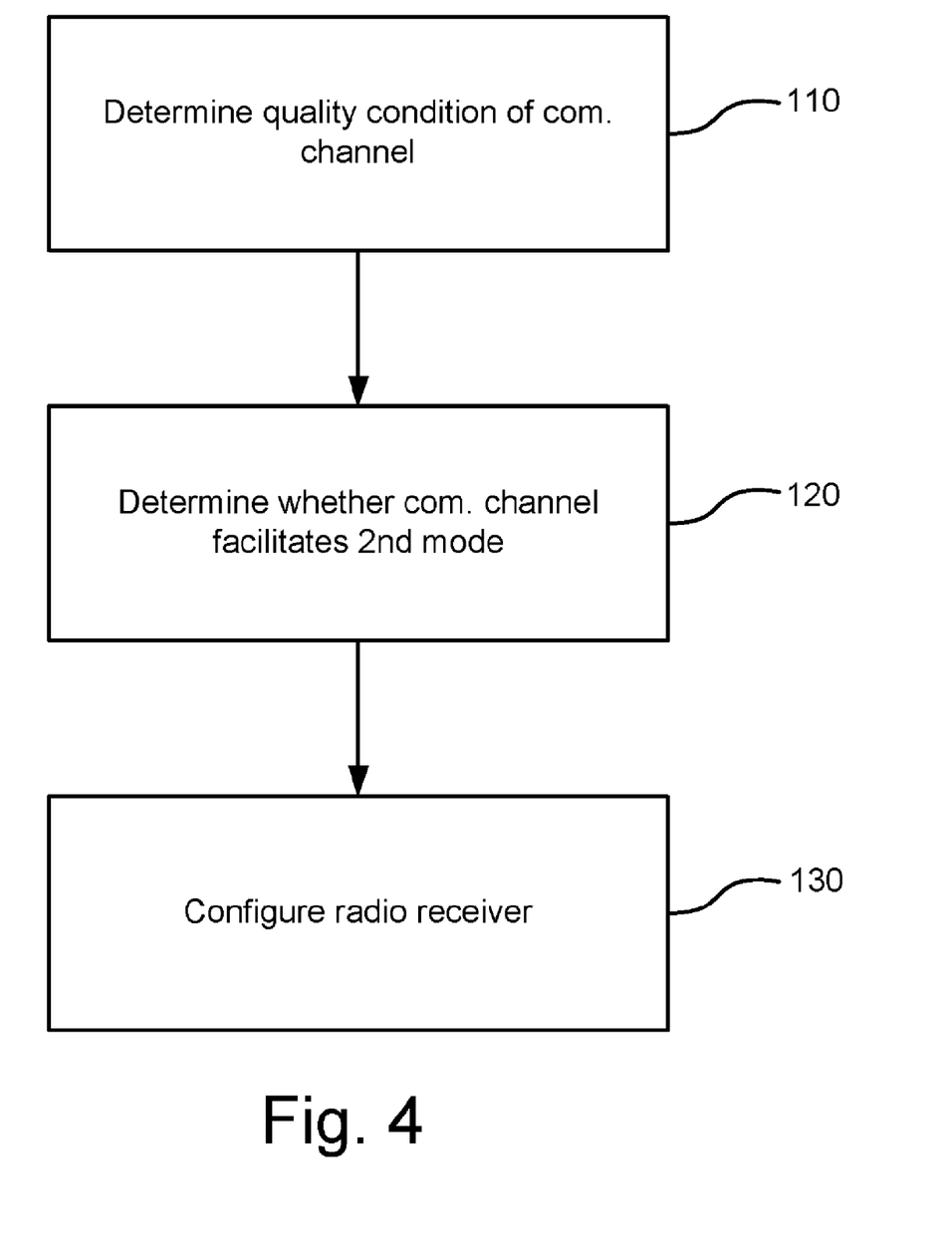
FIG. 4 is a flow chart of an embodiment of a method for operating a radio receiver.

FIG. 4 is a flow chart of an embodiment of a method for operating the radio receiver 4. The quality condition of the communication channel 3 is determined in step 110. In step 120, it is determined whether the communication channel 3 facilitates operation in the second mode. The radio receiver 4 is configured to operate in the first or second mode in step 130.

According to an embodiment, the quality condition is an SIR of the communication channel 3, such as the SIR of a pilot signal. Determining the quality condition in step 110 comprises determining, e.g. by measuring or estimating, the SIR. Further, determining whether the communication channel 3 facilitates operation in the second mode in step 120 comprises comparing the SIR with a threshold value. For example, it may be determined in step 120 that the communication channel 3 facilitates operation in the second mode if the SIR exceeds the threshold value.

In step 130, the radio receiver 4 is configured to operate in the second mode when all of at least one configuration condition are fulfilled or to operate in the first mode otherwise. According to embodiments, one configuration condition is that the communication channel 3 is determined to facilitate operation in the second mode.

Figure 5:
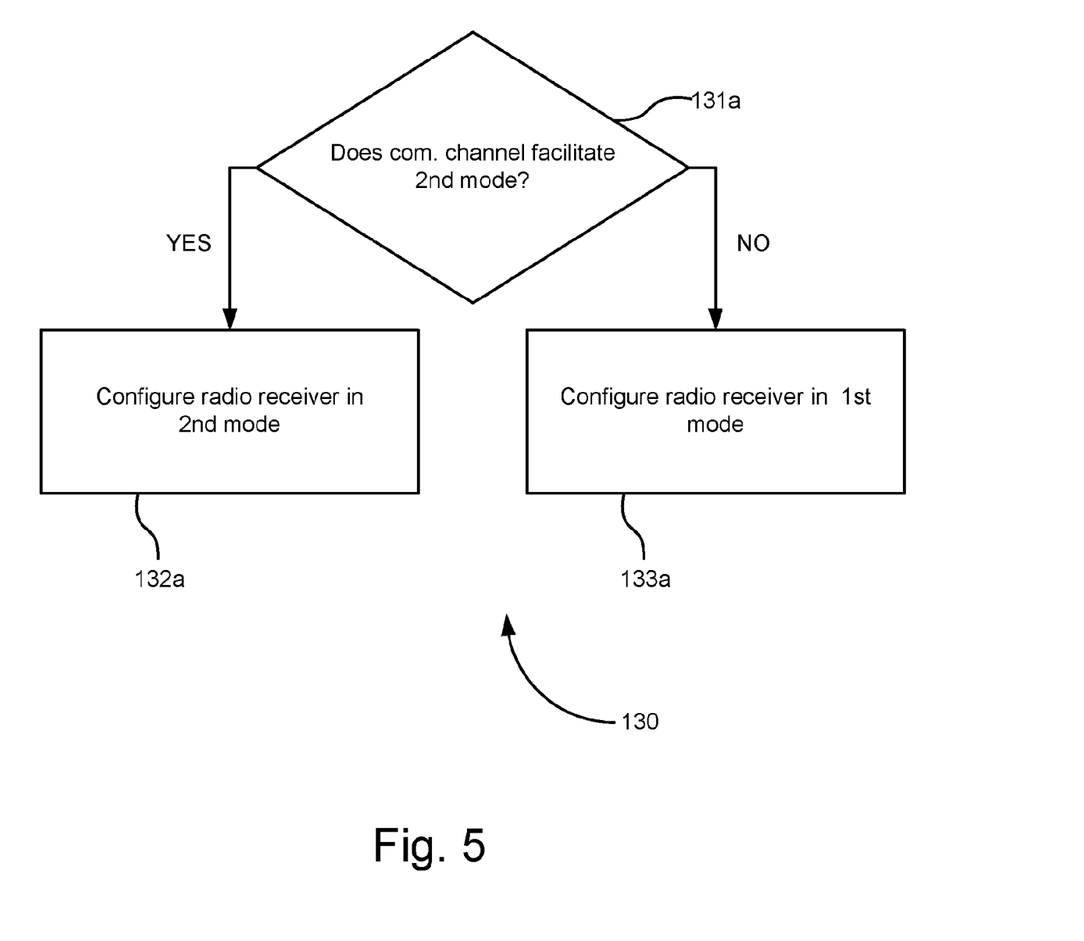
FIG. 5 is a flow chart of an embodiment of a step in the flow chart of FIG. 4.

According to some embodiments of the method, the radio receiver 4 is configured to operate in the second mode in step 130 only based on the quality condition. For example, the radio receiver may be configured to operate in the second mode when the communication channel 3 is determined to facilitate operation in the second mode based on the quality condition and to operate in the first mode otherwise. This is illustrated with a flow chart in FIG. 5, showing an embodiment of step 130 (FIG. 4). In step 131a, it is checked whether the communication channel 3 is determined, in step 120 (FIG. 4), to facilitate operation in the second mode. If the answer in step 131a is yes, the radio receiver is configured to operate in the second mode in step 132a. If the answer in step 132a is no, the radio receiver is configured to operate in the first mode in step 133a. For the embodiment of FIG. 5, the above configuration condition, i.e. that the communication channel 3 is determined to facilitate operation in the second mode, is the only configuration condition.

Figure 6:
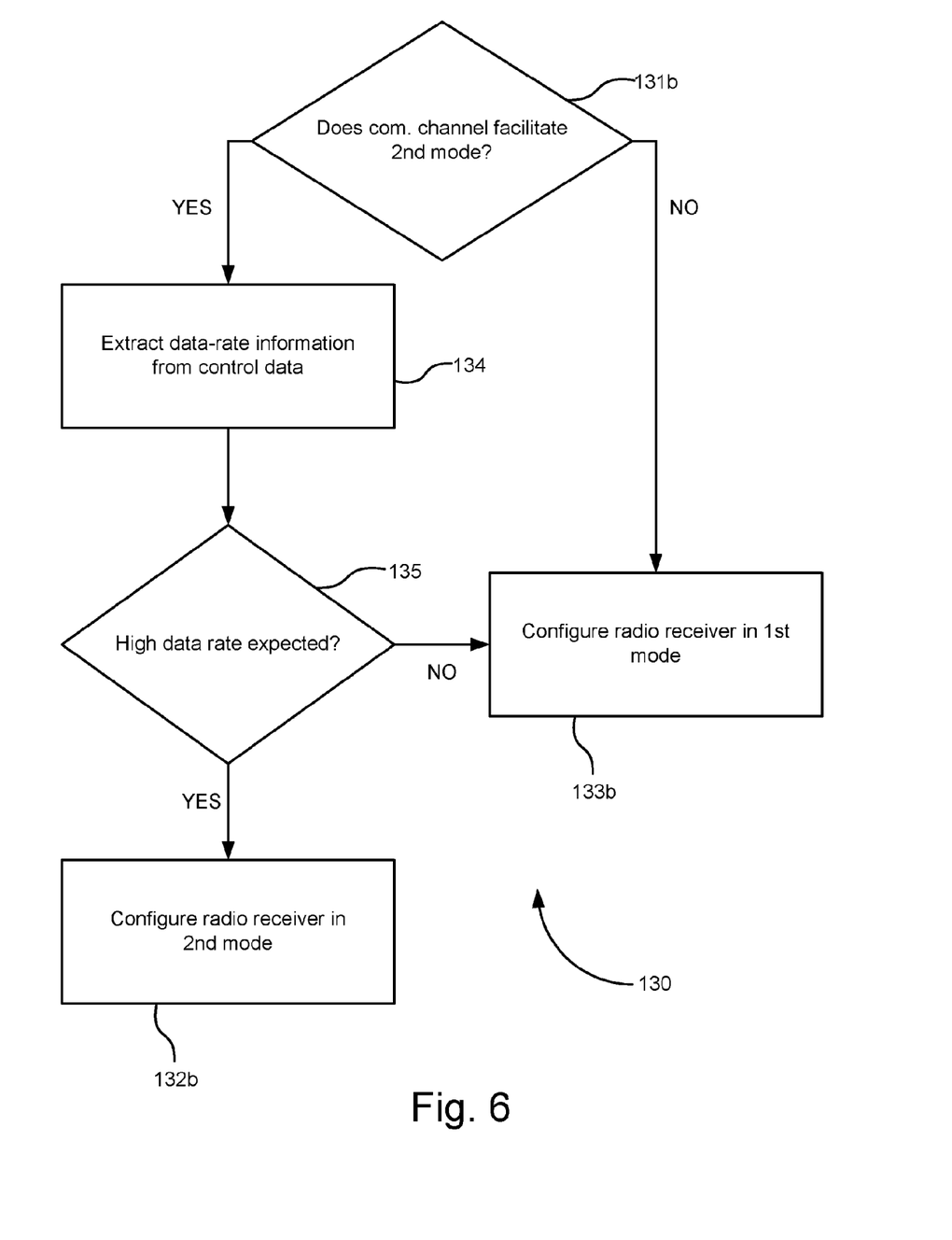
FIG. 6 is a flow chart of another embodiment of a step in the flow chart of FIG. 4.

According to other embodiments, the radio receiver is configured to operate in the second mode in step 130 (FIG. 4) when the communication channel 3 is determined to facilitate operation in the second mode and at least one additional configuration condition is fulfilled as well. An example of such an embodiment is illustrated with a flow chart in FIG. 6, showing another embodiment of step 130 (FIG. 4). It is checked in step 131b whether the communication channel 3 is determined, in step 120 (FIG. 4), to facilitate operation in the second mode. If the answer in step 131b is no, the radio receiver 4 is configured to operate in the first mode in step 133b. If the answer in step 131b is yes, control data indicating the data rate of the data to be received is extracted in step 134. The control data extracted in step 134 may be control data received over the communication channel 3. In an HSDPA embodiment, the control data is received over an HS-SCCH. In step 135, it is determined whether the control data extracted in step 134 indicates that the data to be received is expected to be transmitted over the communication channel 3 at a high data rate. That is, in this embodiment, one configuration condition is that the data to be received is expected to be transmitted over the communication channel 3 at a high data rate. If the answer in step 135 is yes, the radio receiver is configured to operate in the second mode in step 132b. If the answer in step 135 is no, the radio receiver is configured to operate in the first mode in step 133b.

An advantage of the embodiment of FIG. 6, compared with the embodiment of FIG. 5, is that unnecessary configuration into the second mode may be avoided. For example, when only low data rates are used, the second mode is not required, and if the channel conditions vary around the border between facilitating and not facilitating operation in the second mode, it may be beneficial for the receiver robustness to operate the radio receiver 4 in the first mode and avoid frequent switching between the first and second modes.

According to some embodiments, the control data, on which the determination in step 135 is based, includes information explicitly stating the data rate that will be used for the data to be received. Step 134 may then comprise extracting said explicit information from the control data.

In HSDPA, information explicitly stating the data rate used for data transmitted over the HS-PDSCH is included in control data transmitted over the HS-SCCH. However, the mutual timing of the HS-PDSCH and the HS-SCCH is such that reception of the data in the HS-PDSCH, to which the explicit information of the data rate relates, is commenced before the radio receiver 4 has received said explicit information. Therefore, in HSDPA, the explicit information of the data rate transmitted over the HS-SCCH cannot be used as a basis for the determination in step 135, because the configuration of the radio receiver needs to be performed before the data is received over the HS-PDSCH. However, other information is transmitted over the HS-SCCH before the data is transmitted over the HS-PDSCH. Such other information indicates whether it is likely that the data to be received is transmitted at a high data rate. Hence, the other information may be used as a basis for the determination in step 135. Examples of the other information are the number of spreading codes, or data packet channelization codes, and the modulation format. In HSDPA, 1-15 data packet channelization codes may be used. A higher number of data packet channelization codes indicates a higher data rate. Further, the modulation formats used in HSDPA are quaternary phase-shift keying (QPSK) or 16-point quadrature amplitude modulation (16-QAM).

According to an embodiment, step 135 comprises extracting the number of data packet channelization codes from the control data. The data to be received is expected to be transmitted over the communication channel 3 at a high data rate if said number of data packet channelization codes exceeds or equals a threshold value. According to an HSDPA embodiment, the threshold value is 15 (i.e. the maximum number of codes). According to another HSDPA embodiment, the threshold value is 11, which is the minimum number of data packet channelization codes needed to enable a data rate of 10 Mbit/s. The theoretical maximum value of the data rate per data packet channelization code in HSDPA is 0.93 Mbit/s. Suitable threshold values may, of course, vary between different applications and receiver implementations. Thus, the given examples should not be considered limiting.

According to another embodiment, step 134 comprises extracting the modulation format from the control data. The data to be received is expected to be transmitted over the communication channel 3 at a high data rate if a specific modulation format is used. What the specific modulation format is may be different in different applications. According to an HSDPA embodiment, the specific modulation format is 16-QAM.

The determination in step 135 may be based on a combination of the number of data packet channelization codes and the modulation format. According to some HSDPA embodiments, the data to be received is determined, in step 135, to be expected to be transmitted at a high data rate if at least $N_{th}$ data packet channelization codes with the modulation format 16-QAM are used. $N_{th}$ is a threshold level. According to a specific embodiment, $N_{th}$ is 15. 15 data packet channelization codes with the modulation format 16-QAM are used in the highest data rate (14 Mbit/s) in HSDPA. According to other HSDPA embodiments, $N_{th}$ is 11, 12, 13, or 14. Suitable values for $N_{th}$ may, of course, vary between different applications and receiver implementations. Thus, the given examples should not be considered limiting.

According to an embodiment, the control data includes a code rate for the data to be received. Step 134 may then comprise extracting the code rate from the control data.

According to some embodiments, step 132*a* (FIG. 5) and step 132*b* (FIG. 6) comprises locking the AGC unit 45 (FIG. 2) of the radio receiver 4. Alternatively, step 132*a* (FIG. 5) and step 132*b* (FIG. 6) may comprise configuring the AGC unit 45 to reduce the adjustments of the gain of the VGA 41 (FIG. 2) compared with operation in the first mode. For example, the update period of the AGC unit 45 may be increased, compared with operation in the first mode, or the AGC unit 45 may be configured to update the gain of the VGA 41 only when the signal level has changed more than a threshold value, which may e.g. be predefined.

Further, step 132*a* (FIG. 5) and step 132*b* (FIG. 6) may alternatively or additionally comprise disabling the DC-block unit 42 (FIG. 2), or setting the cut-off frequency of the filter 42*a* to the second value. Similarly, step 133*a* (FIG. 5) and step 133*b* (FIG. 6) may comprise enabling the DC-block unit 42 or setting the cut-off frequency of the filter 42*a* to the first value.

The method described above by means of different embodiments may e.g. be performed for each packet of data to be received in a packet-based data communication environment. Alternatively, the method may be performed at other regular or irregular intervals, such as once every second, third, or fourth packet of data, etc.

In a conventional solution for coping with the highest data rates in e.g. HSDPA, a radio design with relatively hard circuit requirements in terms of e.g. noise figure, frequency and timing drift, phase noise, image rejection, and introduction of DC offsets to the received signal, is normally employed. Such requirements may be unnecessarily hard e.g. for lower data rates in HSDPA, which are normally used more frequently than the highest data rates. Circuitry in e.g. an AGC loop that is designed for operation under a wide variety of channel conditions and to facilitate reception of all available data rates in HSDPA will occupy an unnecessarily large chip area and consume an unnecessarily large amount of power when operating at said lower data rates.

In embodiments described herein, the radio receiver 4 is configured to operate in the second mode e.g. under good channel conditions, i.e. channel conditions that facilitate operation in the second mode. The radio receiver 4 is configured to operate in the second mode e.g. by disabling and/or adapting parts of the radio receiver 4 that are used under poor channel conditions, e.g. channel conditions that do not facilitate operation in the second mode, for compensation of signal impairments introduced in the channel. This configuration enables the radio receiver 4 to cope e.g. with the highest data rates in HSDPA (such as data rates of 10 Mbit/s and higher) under channel conditions that allow use of these data rates without employing a radio design with relatively hard requirements which is otherwise needed, as described above. Thereby, the radio receiver complexity is reduced e.g. in that a radio receiver circuitry with a relatively low cost in terms of e.g. circuit area and power consumption can be obtained, which is an advantage.

The radio receiver 4 may e.g. be comprised in a communication unit. The communication unit may e.g. be, but is not limited to, the mobile communication unit 1 (FIG. 1), a portable or handheld mobile radio communication unit, a mobile radio terminal, a mobile telephone, a communicator, an electronic organizer, a smartphone, or the like.

The invention may be embedded in a computer program product, which enables implementation of the method and functions described herein. The invention may be carried out when the computer program product is loaded and run in a system having computer capabilities. Computer program, software program, program product, or software, in the present context mean any expression, in any programming language, code or notation, of a set of instructions intended to cause a system having a processing capability to perform a particular function directly or after conversion to another language, code or notation.

The present invention has been described above with reference to specific embodiments. However, other embodiments than the above described are possible within the scope of the invention. Different method steps than those described above, performing the method by hardware or software, may be provided within the scope of the invention. The different features and steps of the invention may be combined in other combinations than those described. The scope of the invention is only limited by the appended patent claims.

The invention claimed is:

1. A method for operating a radio receiver adapted to alternatively receive data over a communication channel in a first mode and a second mode, wherein the second mode facilitates reception of data at higher data rates than the first mode, comprising:

determining a quality condition of the communication channel;

determining whether the communication channel facilitates operation in the second mode based on the quality condition;
assessing at least one configuration condition, one of the at least one configuration condition being that the communication channel is determined to facilitate operation in the second mode; and
configuring the radio receiver to:
operate in the second mode when all of the at least one configuration condition are fulfilled; and
operate in the first mode otherwise; wherein
configuring the radio receiver to operate in the second mode comprises locking an automatic gain-control unit of an automatic gain-control loop in the radio receiver.

2. The method according to claim 1, wherein configuring the radio receiver to operate in the first mode comprises enabling a DC-block unit of the automatic gain-control loop and configuring the radio receiver to operate in the second mode comprises disabling the DC-block unit.

3. The method according to claim 1, wherein configuring the radio receiver to operate in the first mode comprises setting a cut-off frequency of a filter of a DC-block unit of the automatic gain-control loop to a first value and configuring the radio receiver to operate in the second mode comprises setting a cut-off frequency of said filter to a second value, wherein the first value is higher than the second value.

4. The method according to claim 1 wherein the quality condition is a signal-to-interference ratio of the communication channel.

5. The method according to claim 4, wherein determining whether the communication channel facilitates operation in the second mode comprises:
determining that the communication channel facilitates operation in the second mode when the signal-to-interference ratio exceeds a threshold value; and otherwise
determining that the communication channel does not facilitate operation in the second mode.

6. The method according to claim 1, further comprising:
determining, based on control data received over the communication channel, whether data to be received is expected to be transmitted over the communication channel at any data rate, for which reception of data is facilitated in the second mode but not in the first mode; and wherein
one of said at least one configuration condition is that the data to be received is expected to be transmitted over the communication channel at said any data rate, for which reception of data is facilitated in the second mode but not in the first mode.

7. The method according to claim 6, wherein determining whether the data to be received is expected to be transmitted over the communication channel at said any data rate, for which reception of data is facilitated in the second mode but not in the first mode, comprises:
deriving, from the control data, the number of data packet channelization codes to be used for the data to be received; and
determining whether the data to be received is expected to be transmitted over the communication channel at said any data rate, for which reception of data is facilitated in the second mode but not in the first mode, based on said number of data packet channelization codes.

8. The method according to claim 6, wherein determining whether the data to be received is expected to be transmitted over the communication channel at said any data rate, for which reception of data is facilitated in the second mode but not in the first mode, comprises:

deriving, from the control data, a modulation format to be used for the data to be received; and
determining whether the data to be received is expected to be transmitted over the communication channel at said any data rate, for which reception of data is facilitated in the second mode but not in the first mode, based on said modulation format.

9. The method according to claim 6, wherein determining whether the data to be received is expected to be transmitted over the communication channel at said any data rate, for which reception of data is facilitated in the second mode but not in the first mode, comprises:
deriving, from the control data, a code rate to be used for the data to be received; and
determining whether the data to be received is expected to be transmitted over the communication channel at said any data rate, for which reception of data is facilitated in the second mode but not in the first mode, based on said code rate.

10. The method according to claim 1, wherein the communication channel is a high-speed downlink packet access communication channel.

11. The method according to claim 1, wherein the communication channel is an orthogonal frequency-division multiplexing communication channel.

12. A non-transitory computer readable storage medium having stored thereon a computer program product comprising computer program code means for executing a method when said computer program code means are run by an electronic device having computer capabilities, the method being for operating a radio receiver adapted to alternatively receive data over a communication channel in a first mode and a second mode, wherein the second mode facilitates reception of data at higher data rates than the first mode, the method comprising:
determining a quality condition of the communication channel;
determining whether the communication channel facilitates operation in the second mode based on the quality condition;
assessing at least one configuration condition, one of the at least one configuration condition being that the communication channel is determined to facilitate operation in the second mode; and
configuring the radio receiver to:
operate in the second mode when all of the at least one configuration condition are fulfilled; and
operate in the first mode otherwise; wherein
configuring the radio receiver to operate in the second mode comprises locking an automatic gain-control unit of an automatic gain-control loop in the radio receiver.

13. A radio receiver adapted to alternatively receive data over a communication channel in a first mode and a second mode, wherein the second mode facilitates reception of data at higher data rates than the first mode, comprising:
a signal-processing unit adapted to determine a quality condition of the communication channel;
an automatic gain-control loop comprising a variable-gain amplifier and an automatic gain-control unit arranged to control a gain of the variable-gain amplifier; and
a control unit adapted to determine, based on the quality condition, whether the communication channel facilitates operation in the second mode; assess at least one configuration condition, one of the at least one configuration condition being that the communication channel is determined to facilitate operation in the second mode; and configure the radio receiver to:

operate in the second mode when all of the at least one configuration condition are fulfilled; and operate in the first mode otherwise; wherein the control unit is adapted to lock the automatic gain-control unit in the second mode.

14. The radio receiver according to claim 13, wherein the automatic gain-control loop comprises a DC-block unit.

15. The radio receiver according to claim 14, wherein the control unit is adapted to enable the DC-block unit in the first mode and disable the DC-block unit in the second mode.

16. The radio receiver according to claim 14, wherein the DC-block unit comprises a filter and the control unit is adapted to set a cut-off frequency of the filter to a first value in the first mode and a second value in the second mode, wherein the first value is higher than the second value.

17. The radio receiver according claim 13, wherein the quality condition is a signal-to-interference ratio of the communication channel.

18. The radio receiver according to claim 17, wherein the control unit is adapted to determine that the communication channel facilitates operation in the second mode when the signal-to-interference ratio exceeds a threshold value.

19. The radio receiver according to claim 13, wherein the signal-processing unit is further adapted to extract control data from a received signal and the control unit is further adapted to determine, based on said control data, whether data to be received is expected to be transmitted over the communication channel at any data rate, for which reception of data is facilitated in the second mode but not in the first mode, and wherein one of said at least one configuration condition is that the data to be received is expected to be transmitted over the communication channel at said any data rate, for which reception of data is facilitated in the second mode but not in the first mode.

20. The radio receiver according to claim 19, wherein the control unit is further adapted to derive, from the control data, the number of data packet channelization codes to be used for the data to be received and determine whether the data to be received is expected to be transmitted over the communication channel at said any data rate, for which reception of data is facilitated in the second mode but not in the first mode, based on said number of data packet channelization codes.

21. The radio receiver according to claim 19, wherein the control unit is further adapted to derive, from the control data, a modulation format to be used for the data to be received and determine whether the data to be received is expected to be transmitted over the communication channel at said any data rate, for which reception of data is facilitated in the second mode but not in the first mode, based on said modulation format.

22. The radio receiver according to claim 19, wherein the control unit is further adapted to derive, from the control data, a code rate to be used for the data to be received and determine whether the data to be received is expected to be transmitted over the communication channel at said any data rate, for which reception of data is facilitated in the second mode but not in the first mode, based on said code rate.

23. The radio receiver according to claim 13, wherein the communication channel is a high-speed downlink packet access communication channel.

24. The radio receiver according to claim 13, wherein the communication channel is an orthogonal frequency-division multiplexing communication channel.

25. A communication unit comprising the radio receiver according to claim 13.

26. The communication unit according to claim 25, wherein the communication unit is a portable or handheld mobile radio communication unit, a mobile radio terminal, a mobile telephone, a pager, a communicator, an electronic organizer, or a smartphone.

* * * * *